(12) United States Patent
Rodat et al.

(10) Patent No.: US 9,784,473 B2
(45) Date of Patent: Oct. 10, 2017

(54) SOLAR SYSTEM FOR REPRODUCING THE EFFECT OF A COMBUSTION FLAME

(75) Inventors: Sylvain Rodat, Gages (FR); Stéphane Abanades, Les Angles (FR); Gilles Flamant, Llo (FR)

(73) Assignee: Centre National de la Recherche Scientifique (CNRS) (FR)

( * ) Notice: Subject to any disclaimer, the term of this patent is extended or adjusted under 35 U.S.C. 154(b) by 371 days.

(21) Appl. No.: 14/009,868

(22) PCT Filed: Apr. 4, 2012

(86) PCT No.: PCT/EP2012/056129
§ 371 (c)(1),
(2), (4) Date: Dec. 10, 2013

(87) PCT Pub. No.: WO2012/136689
PCT Pub. Date: Oct. 11, 2012

(65) Prior Publication Data
US 2014/0083415 A1  Mar. 27, 2014

(30) Foreign Application Priority Data

Apr. 4, 2011 (FR) ...................... 11 52862

(51) Int. Cl.
*F24J 2/07* (2006.01)
*F24J 2/24* (2006.01)
*F24J 2/10* (2006.01)

(52) U.S. Cl.
CPC . *F24J 2/07* (2013.01); *F24J 2/24* (2013.01); *F24J 2/10* (2013.01); *Y02E 10/41* (2013.01); *Y02E 10/44* (2013.01); *Y02P 80/24* (2015.11)

(58) Field of Classification Search
CPC ......... F24J 2/07; F24J 2/24; F24J 2/10; Y02P 80/24; Y02E 10/41; Y02E 10/44
See application file for complete search history.

(56) References Cited

U.S. PATENT DOCUMENTS

| 4,164,123 A | 8/1979 | Smith |
| 6,872,378 B2 * | 3/2005 | Weimer ................ B01J 8/0045 252/373 |
| 2010/0237291 A1 | 9/2010 | Simmons et al. |

FOREIGN PATENT DOCUMENTS

| FR | 0957204 A | 2/1950 |
| WO | 03049853 A1 | 6/2003 |

OTHER PUBLICATIONS

International Search Report for Application No. PCT/EP2012/056129 dated May 23, 2012.

* cited by examiner

*Primary Examiner* — Alfred Basichas
(74) *Attorney, Agent, or Firm* — Lerner, David, Littenberg, Krumholz & Mentlik, LLP (57) ABSTRACT

The present invention relates to a solar system for providing volumetric energy reproducing the effect of a combustion flame for a high-temperature industrial process, characterized in that it comprises:
  a solar receiver exposed to concentrated solar radiation, in which heat transfer fluid (liquid or gas) is brought to high temperature;
  at least one high-temperature chamber in which said high-temperature industrial process is performed;
  injection means of the heat transfer fluid in the form of a gas jet reproducing a combustion flame in the at least one high-temperature chamber.

The present invention also relates to a process for providing volumetric energy reproducing the effect of a combustion flame for this purpose.

20 Claims, 7 Drawing Sheets

SOLAR SYSTEM FOR REPRODUCING THE EFFECT OF A COMBUSTION FLAME

CROSS REFERENCE TO RELATED APPLICATIONS

The present application is a national phase entry under 35 U.S.C. §371 of International Application No. PCT/EP2012/056129, filed Apr. 4, 2012, published in French, which claims priority from French Patent Application No. 1152862, filed Apr. 4, 2011, the disclosures of which are incorporated by reference herein.

GENERAL TECHNICAL FIELD

The present invention relates to the field of high-temperature solar thermal and thermochemical systems.

More precisely, it relates to a solar system for providing volumetric energy reproducing the effect of a combustion flame for a high-temperature industrial process by means of transfer fluid.

PRIOR ART

Numerous industrial processes, for example the furnace process for producing carbon black, need a large input of heat energy to a volume of material to be treated. Required temperatures reach 2000° C.

Currently, these high temperatures are produced almost exclusively by the combustion of fossil resources, hydrocarbons in particular. In fact with the plasma process, <<flame combustion>> is one of the only ways to obtain volumetric thermal input (i.e. heat brought to a volume) at the industrial level. The name <<flame temperatures>> also designates those temperatures to which these processes are subjected.

These classic techniques have provided proof but best need a large electricity supply, if not consumption of fossil resources, and cause greenhouse gas emissions and/or pollutants (NOx, SOx, particles).

It would be preferable to have an alternative to combustion flame to be obtained from renewable energy only, and solar energy in particular.

In fact, so-called concentration solar systems enable conversion of solar radiation to heat energy, which is generally used for electricity production.

One of these concentration systems is the tower power plant. Such a system comprises a tower and a field of mobile mirrors called heliostats, which concentrates the radiation onto a reduced area at the apex of the tower.

Figure 1:
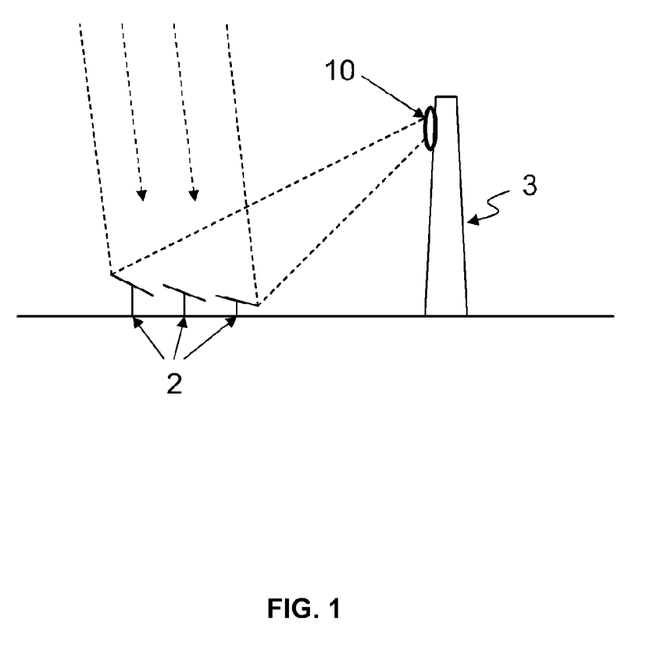
FIG. 1 previously described is a drawing of a known solar thermodynamic tower power plant.

This zone lit by the concentrated radiation receives several hundred times the direct solar irradiation and is equipped with a device called a solar receiver the function of which is to transmit this energy to a fluid (liquid or gas) which circulates there, generally water steam turbined to produce electricity. FIG. 1 illustrates a thermodynamic tower power plant comprising a tower 3, a field of heliostats 2, and the solar receiver 10.

The solar receiver described in patent application US 2010/0237291 comprises a cavity traversed by a plurality of tubes in which chemical compounds circulate which can react in so-called endothermal reactions, that is, needing high temperatures usually employed under the effect of a combustion flame (cracking of methane, for example). The external wall of the tubes receives the concentrated solar radiation, which brings it to high temperature: the tubes act as transfer wall. However, the thermal input is not volumetric input but surface input: the heat is transferred to the chemical reagents by contact with the internal wall of the tubes. This surface thermal input reproduces the effect of a combustion flame poorly, since chemical reaction takes place mainly at the level of the walls. This diminishes the yield and causes the appearance then growth of deposits of solid residue on the walls (in this case pure carbon in the case of a cracking process), which rapidly makes the receiver unusable: deposits decrease the thermal input and obstruct the tubes.

Alternatively, international patent application WO 03/049853 proposes a solar receiver (a porthole allows return of the concentrated solar radiation), in which the chemical compounds to be heated circulate directly. A cloud of solid absorbent microparticles (carbon black smoke, for example) is suspended in the receiver. It is these particles which are irradiated by the concentrated solar radiation and diffuse heat energy which they receive to carry out the endothermal reaction. Heat input this time is definitely volumetric (thermal exchange takes place rigorously on the surface of particles, but by relatively even diffusion of the particles in the volume it is assimilable to volumetric thermal input), and best reproduces the effect of a combustion flame. However, performances of this type of solar receiver are very limited: in fact, particles rapidly tend to deposit on the porthole and cloud it. Recovering reaction products is also complex as the resulting gas has to be filtered for isolating and recovering microparticles without contaminating the products. Industrial interest is therefore low.

Current technologies are yet to offer a viable industrial solar alternative to the combustion flame for high-temperature industrial processes.

PRESENTATION OF THE INVENTION

According to a first aspect, the present invention therefore relates to a solar system for providing volumetric energy reproducing the effect of a combustion flame for a high-temperature industrial process, characterised in that it comprises:
a solar receiver exposed to concentrated solar radiation, in which heat transfer fluid (liquid or gas) is brought to a high temperature;
at least one high-temperature chamber in which said high-temperature industrial process is performed;
injection means of the heat transfer fluid in the form of a gas jet reproducing a combustion flame in the at least one high-temperature chamber.

According to other advantageous and non-limiting characteristics:
the solar receiver comprises a cavity, the cavity being provided with an opening transparent to concentrated solar radiation, and at least one solar absorption element irradiated by the concentrated solar radiation through the opening;
the solar absorption element or the solar absorption elements are tubes and/or ducts lining at least one wall of the cavity;
the heat transfer fluid circulates in the solar absorption element or the solar absorption elements, the heat transfer fluid being brought to a high temperature by heat transfer in contact with the internal surface of the solar absorption elements;
the heat transfer fluid circulates in the cavity, the opening being covered with a porthole transparent to concentrated and sealed solar radiation, and the heat transfer fluid being brought to high temperature by heat transfer in contact with the external surface of the solar absorption element or the solar absorption elements;

the cavity and the solar absorption element or the solar absorption elements are made of ceramic or graphite;

the solar receiver is traversed by a duct in which the heat transfer fluid is in motion, the heat transfer fluid being brought to a high temperature by heat transfer in contact with the internal surface of a wall of the duct whereof the external surface is irradiated by the concentrated solar radiation;

the heat transfer fluid is injected under pressure into the solar receiver;

the injection means of the heat transfer fluid in the high-temperature chamber consist of a conduit via which the high-temperature heat transfer fluid escapes from the solar receiver to the high-temperature chamber under the effect of the internal pressure in the solar receiver;

the pressure in the high-temperature chamber is less than the pressure in the solar receiver, the form of gas jet being caused by detente of the heat transfer fluid as it leaves the injection means:

the temperature of the high-temperature heat transfer fluid is between 1000° C. and 2500° C.

the high-temperature chamber is a furnace, and the high-temperature industrial process is a process for obtaining metallic or ceramic material;

the high-temperature chamber is a chemical reactor, and the high-temperature industrial process is an endothermal chemical reaction;

the heat transfer fluid comprises chemically inert gas and/or a reagent of said endothermal chemical reaction and/or a product of said endothermal chemical reaction;

at least one reagent of said endothermal chemical reaction is injected into the high-temperature reactor at the level of an injection zone of the high-temperature heat transfer fluid;

the endothermal chemical reaction is the cracking of methane;

the heat transfer fluid is dihydrogen, methane being injected into the high-temperature reactor;

the system comprises a plurality of high-temperature chambers, each being a chemical reactor, the products of the nth reactor being injected into the n+1st reactor.

A second aspect of the invention relates to a process for volumetric energy reproducing the effect of a combustion flame for a high-temperature industrial process, characterised in that it comprises steps of:

irradiation of a solar receiver in which heat transfer fluid circulates by concentrated solar radiation to bring the heat transfer fluid to high-temperature;

injection of the heat transfer fluid into a high-temperature chamber in the form of a gas jet reproducing a combustion flame;

performing said high-temperature industrial process in the high-temperature chamber under the effect of the combustion flame produced.

PRESENTATION OF FIGURES

Other characteristics and advantages of the present invention will emerge from the following description of a preferred embodiment. This description will be given in reference to the attached drawings, in which:

FIGS. 3b and 3c are two views in section of two embodiments of this solar receiver;

DETAILED DESCRIPTION

General Architecture and Principle

Figure 2:
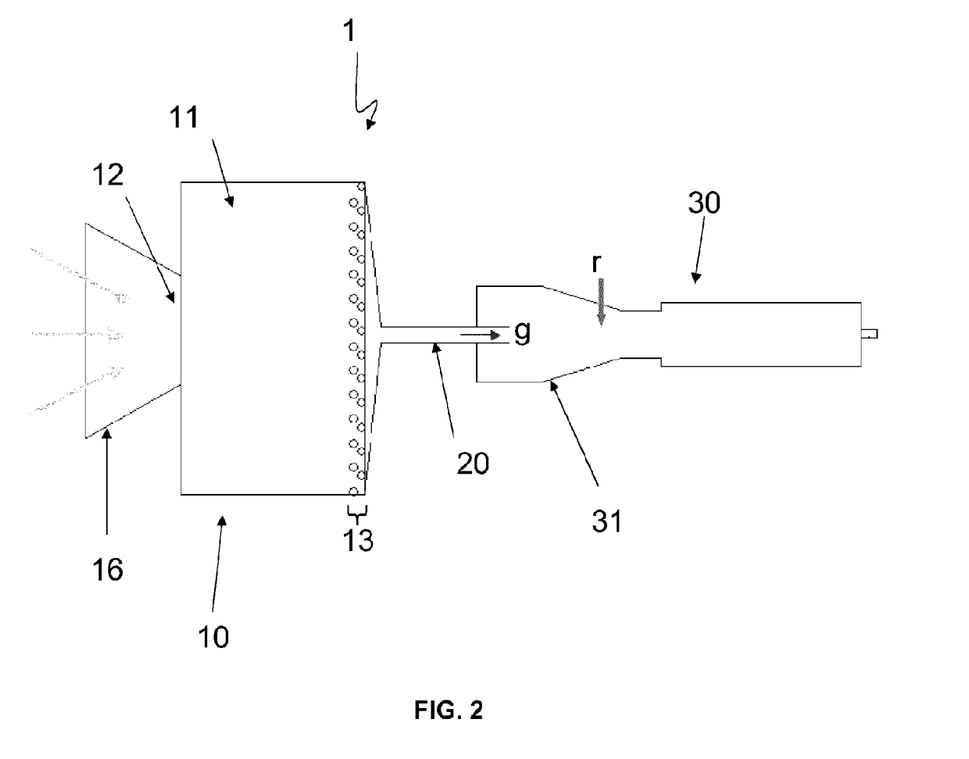
FIG. 2 is a drawing of an embodiment of the solar system according to the invention.

In reference to the drawings and first to FIG. 2, the solar system 1 according to the invention comprises three main parts: a solar receiver 10, a high-temperature chamber 30, and fluid injection means 20 from the solar receiver 10 to the high-temperature chamber 30.

The <<high temperatures>> to be mentioned in the present description correspond to temperatures which can almost be attained only by a combustion flame or plasma, and not by simple electrical resistances. These high temperatures are typically above 1000° C. and if needed can reach 2000° C. or even 2500° C.

As is seen from FIG. 2, the solar receiver is exposed to concentrated solar radiation. As explained previously, concentration of the solar radiation means focussing solar radiation received by a vast surface onto a small surface using optical systems: fields of mirrors (heliostats), large parabolic mirror, lenses, etc. The energy received by the receiver 10 equals total solar energy incident to optical losses, for example close to energy captured by the total surface of the field of heliostats 2 in FIG. 1.

Heat transfer fluid f circulates in the receiver 10, this fluid being brought to high temperature under the effect of the concentrated solar radiation. Different types of fluids and different receiver geometries will be described in detail below.

The high-temperature chamber 30 is as such the site of a high-temperature industrial process. As will be explained hereinbelow, numerous industrial processes can be employed within the scope of the present invention, in particular any process needing volumetric energy, and especially if this input is generally made by a combustion flame.

The core of the invention is injection via the injection means 20 of the heat transfer fluid f in the form of a gas jet g into the at least one high-temperature chamber 30. In fact, a flame comprises only final high-temperature gas products or intermediate products of the combustion reaction which engendered it (generally $CO_2$, $H_2O$), the luminous aspect of the flame due to excitation of electrons of these gases. A high-temperature gas jet can therefore be equivalent to a combustion flame. Therefore, injecting the heat transfer fluid f heated at the level of a fine opening of the chamber 30 at a sufficient rate simulates a burner and a combustion flame is reproduced.

Architecture of Solar Receiver

The expert knows numerous types of solar receivers 10. It is On noted that the invention is not limited to any type of receiver in particular, but can be applied to any receiver which is capable of bringing the heat transfer fluid f to a high temperature under the effect of the concentrated solar radiation.

Three advantageous and particularly adapted embodiments will be cited.

Figure 3A:
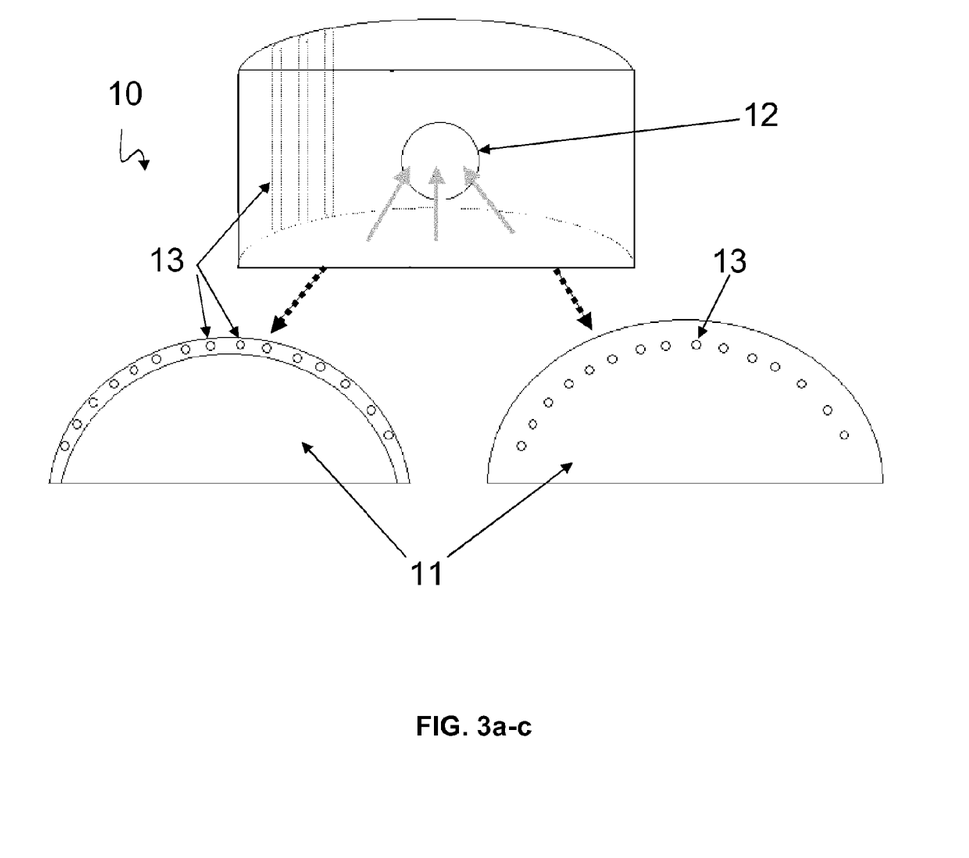
FIG. 3a is a view in perspective of a solar receiver used by the system according to the invention.

In the first, in keeping with FIG. 3a for example, and in the second, the solar receiver 10 comprises a cavity 11, the cavity 11 being provided with an opening 12 transparent to concentrated solar radiation, and at least one solar absorption element 13 irradiated by concentrated solar radiation through the opening 12. Opening means any <<window>> which lets through solar radiation, whether glassed or a simple hole in the wall of the receiver 10. The opening 12 can be enclosed by a collector cone 16 (secondary concentrator) made of reflecting material, as in FIG. 2, this cone concentrating even more precisely concentrated solar radiation to the opening 12.

The solar absorption elements 13 are refractory elements which will heat under the effect of the concentrated solar radiation. It is at the level of their wall where the solar energy is effectively transformed into heat. The first and the second mentioned embodiment of the receiver 10 differ from the form of these elements 13 and the circulation drawing of the heat transfer fluid f.

In this first embodiment, as is evident in FIG. 3b and respectively in FIG. 3c, the solar absorption element or the solar absorption elements 13 are advantageously ducts and/or tubes lining at least one wall of the cavity 11, in particular the wall opposite the opening 12, that is, the wall exposed to the concentrated radiation. In this way, the heat transfer fluid f circulates in the solar absorption elements 13, and it is brought to a high temperature by heat transfer in contact with the internal surface of the solar absorption elements 13. Alternatively, the ducts and/or tubes cannot be placed against a wall of the cavity 11, so as to indirectly receive radiation by reflection on the walls of the cavity 11.

The heat appears on the external wall of these tubes or ducts, and is transmitted by conduction to the internal wall, cooled by passage of the heat transfer fluid. In the <<ducts>> configuration, which are made in the material comprising the base of the cavity 11, it is noted that there is an external wall common to all the ducts, which is actually the base of the cavity 11. In the case of parallelepipedic or semi-cylindrical solar receivers 10, most often the case, this wall is substantially orthogonal to the axis of incidence of the solar radiation, and therefore undergoes the maximal rise in temperature. In the <<tubes>> configuration (in this configuration the absorption elements 13 are formed by tubes separate from the cavity 11), multiple reflections on the base of the cavity 11 ensure that the entire periphery of the external wall of the tubes is exposed.

The internal exchange surface between the tubes/ducts and the heat transfer fluid per se has an interest in being the highest possible since the coefficients of conducto-convective exchanges with a solid-gas interface are low. It is also not useful to have large diameters of tubes/ducts, since exchanges are made on the wall only. Advantageously, tubes/ducts of small diameter are therefore multiplied (below is the description of a particularly preferred embodiment).

The selected materials are materials ultra-resistant to high temperatures (capable of supporting 2000° C. for several hours), but relatively conductive of heat. The solar absorption elements 13 and more particularly the cavity 11 are therefore selected in ceramic or graphite (sublimation point at 3652° C.). Tubes made of metallic materials with high-temperature fusion are also feasible, though graphite is preferred.

Since the heat transfer fluid f is separated tightly from the cavity 11 by the wall of the tubes, the cavity 11 most often no longer needs to be hermetic. A simple hole is adequate as opening 12, but advantageously it is still fitted with a glass pane to insulate the cavity 11 from the oxidising atmosphere, harmful in particular to graphite. The cavity can then be filled with neutral atmosphere (nitrogen or argon, for example).

Figure 4:
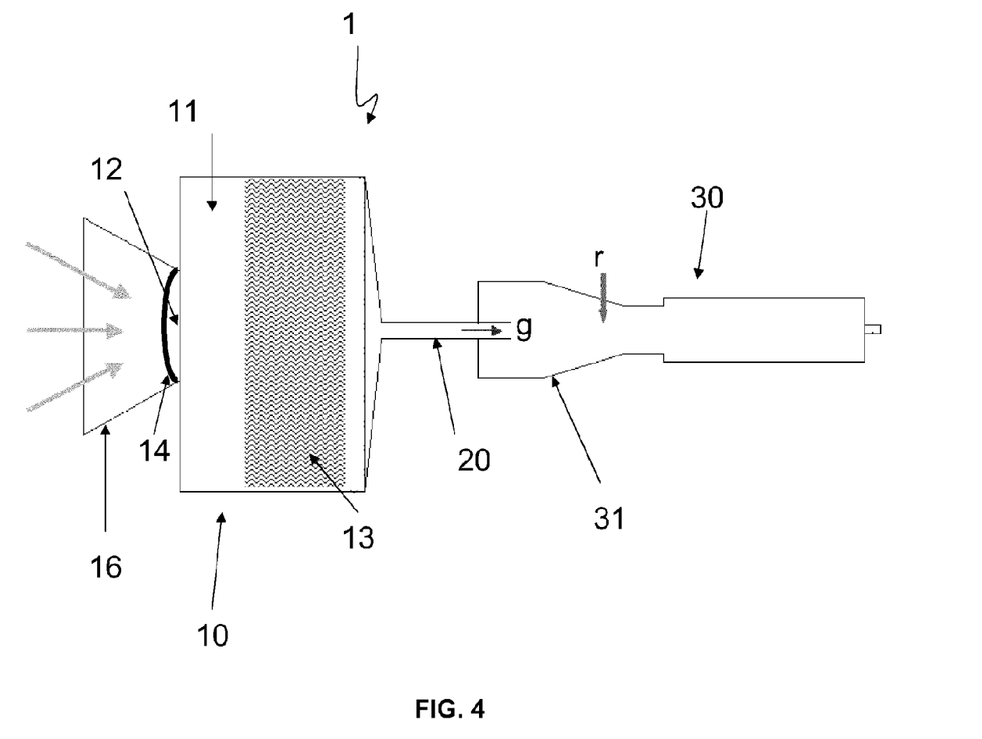
FIG. 4 is a drawing of another embodiment of the solar system according to the invention.

Alternatively, the heat transfer fluid f can be circulated directly in the cavity 11. The opening 12 is obligatorily closed by a porthole 14 transparent to concentrated solar radiation, sealed off and resistant to pressure. In this second embodiment, the fluid f circulates around the thermal absorption elements 13, and not inside the latter. The fluid is therefore brought to a high temperature by heat transfer in contact with the external surface of the solar absorption elements 13, still irradiated by the concentrated solar radiation via the opening 12. This solar receiver 10 is evident in FIG. 4.

There is therefore greater liberty of form for the absorption elements 13, and advantageously beehive structures, porous foam or aerosols are selected which offer a very high exchange surface with fluid f. These structures typically occupy the entire cross-section of the cavity so as to force the heat transfer fluid f to pass through it.

The preferred materials and the dimensions are substantially the same as for the first embodiment.

According to the advantageous third embodiment, the cavity 11 and the opening 12 can be omitted. The solar receiver 10 is in fact traversed by a duct in which the heat transfer fluid f is in motion, the heat transfer fluid f being brought to a high temperature directly by heat transfer in contact with the internal surface of a wall of the duct the external surface of which is irradiated by the concentrated solar radiation. To boost heat transfer, elements generating turbulences in this duct can be used. This solution is very close to the first with ducts integrated in the cavity, it must be known that at higher temperatures a cavity will be necessary to decrease heat losses by infrared radiation to the exterior.

Such a solar surface duct receiver is described especially in French patent application FR0957204.

Particularly Preferred Embodiment of the Receiver

A particularly advantageous solar receiver 10 developed by PROMES laboratories (Unit CNRS 8521), according to the first embodiment of the receiver described previously, is illustrated in FIG. 5. This multi-tubular experimental receiver was able to heat the heat transfer fluid f to a temperature of 2073° K.

Figure 5:
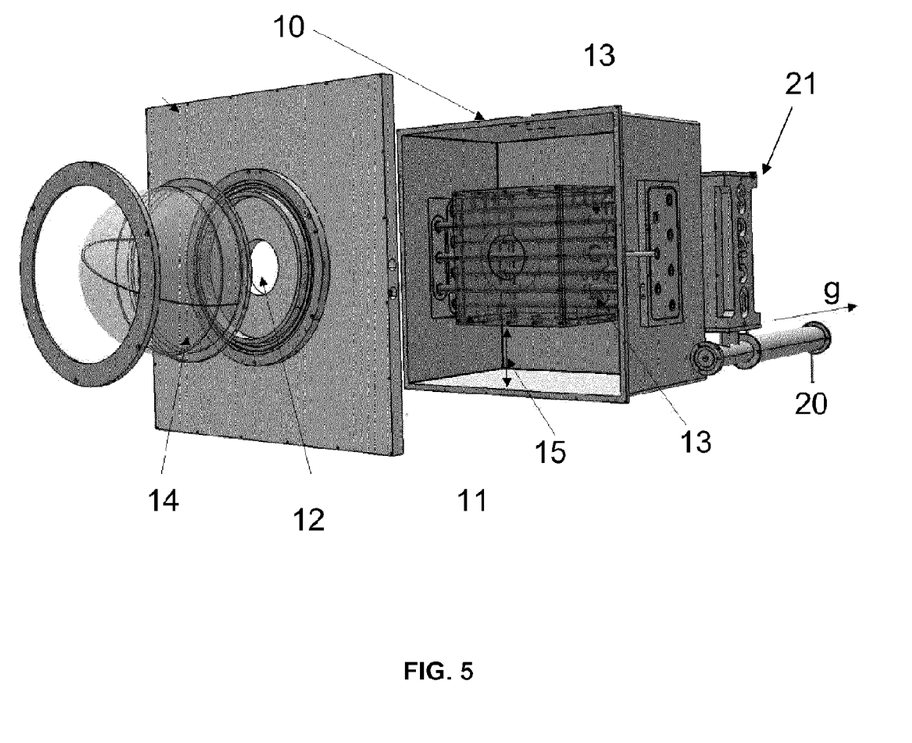
FIG. 5 is a drawing of a particularly advantageous embodiment of a solar receiver of the solar system according to the invention.

This receiver 10 comprises an aluminium envelope and a substantially cubic graphite receptive cavity 11 (around 40 cm per side). The opening 12 letting the concentrated solar flow through has a diameter of 13 cm. The tubes 13, seven in total, are 800 mm long with an inner diameter of 18 mm and an outer diameter of 26 mm. They are positioned staggered horizontally. A hemispherical porthole 14 made of quartz 360 mm in diameter and 5 mm thick insulates the cavity 11 from the oxidising atmosphere. The zone 15 (overall parallelepipedic, with a side of the order of 800 mm) enclosing the cavity 11 is filled with layers of insulating materials (for example fibrous materials made of aluminosilicate or graphite felt) which help maintain heat in the cavity 11.

Heat Transfer Fluid and Injection

Fluid means liquid or gas entering the solar receiver 10, provided however that at levels of high temperature achieved at the outlet of the solar receiver 10 the vaporisation temperature has been attained such that the heat transfer fluid f may take the form of a gas jet g. Gaseous fluid in the STP (Standard conditions for temperature and pressure) is however preferred as there is no problem of change of state (consumption of vaporisation enthalpy).

Very many fluids can be used, the choice depends essentially on the industrial process for which the fluid reproduces a combustion flame. In fact this fluid must either be stable at nominal high injection temperatures in the chamber 30 and relative to components used during the process, subject to interfering with this process, or on the contrary be an active constituent of the process whereof impact is preferred, for example a reagent of a chemical reaction. Also, fluid must advantageously have good thermal conductivity to rapidly store heat energy and/or have high calorific capacity Cp to store much energy.

In general, dihydrogen (in the absence of dioxygen) and helium are particularly advantageous for their thermal performances and their stability. There are also argon, dinitrogen, and the use of ambient air is also feasible for its low cost and its availability.

For the heat transfer fluid f to be injected into the high-temperature chamber 30, the injection means 20 can comprise pump systems, but only extremely expensive and refined systems can resist temperatures which prevail at the outlet of the solar receiver 10.

This is why the problem is advantageously reversed by effecting the rise in pressure prior to entry to the solar receiver 10, when temperature levels are still low: the heat transfer fluid f is injected under pressure into the solar receiver 10. The pressure level must be adjusted to the mechanical resistance of the elements of the receiver, in particular the tubes 13 or the porthole 14, if there is one. It can nevertheless advantageously be raised by several bars.

The injection means 20 of the heat transfer fluid f in the high-temperature chamber 30 consist advantageously of a single conduit via which the heat high-temperature transfer fluid f escapes from the solar receiver 10 to the high-temperature chamber 30 under the effect of the internal pressure in the solar receiver 10. The diameter of this conduit can be adjusted as a function of pressure and fluid flow in the solar receiver so as to adjust the speed of high-temperature gas exiting from the conduit (in other terms the size of simulated flame) optimal for the process. So if Q is the flow, v the discharge speed and S the surface of a section of the conduit, Q=vS. Assuming that fluid obeys the law of perfect gases PV=nRT, this gives PQ=DRT/M, with D the preferred mass flow, and M the molar mass of the fluid. This gives S=DRT/PvM. Experimental examples of significant values will be given later, but in general radii of a few centimeters are significant, in particular between 1 cm and 10 cm.

Figure 6:
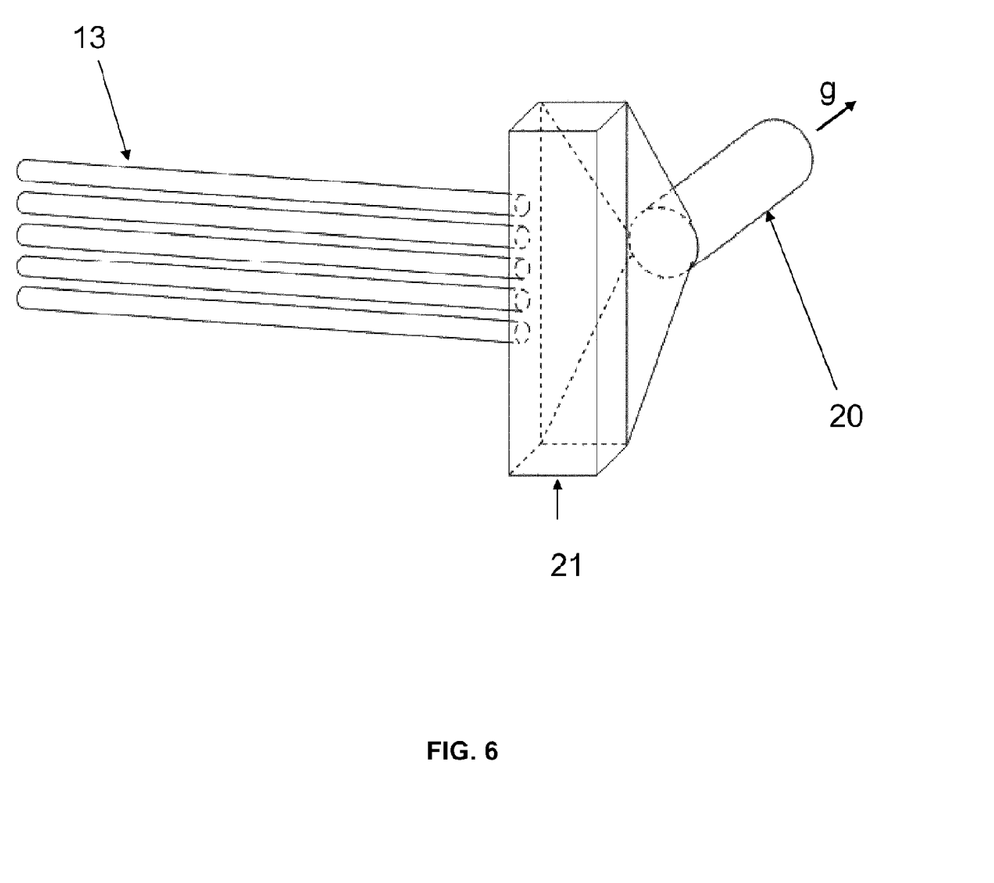
FIG. 6 is a drawing of an embodiment of a collector of the solar system according to the invention.

The connection between the solar receiver 10 and the injection means 20 can be done advantageously by means of a collector 21 such as illustrated in FIG. 6, in particular if the solar receiver 10 is of tubes/ducts 13 type. It is evident that a collector 21 is also present on the receiver of FIG. 5.

The collector 21 enables a mixing zone to homogenise the temperature (the configuration of the cavity 11 can have the tubes 13 not all receive the same quantity of energy) before introduction of high-temperature fluid to the high-temperature chamber 30 via the injection means 20 (in particular when the latter comprise a conduit). Graphite is material adapted by its easy forming capacity and its resistance to temperature. FIG. 6 shows a pointed shape: the hydrodynamic must particularly preferably favour high discharge speeds (between 0.3 and 0.8 Mach are preferred in some industrial processes) to ensure turbulence and efficacious transport of particles. It is understood that the collector 21 must be located closer to the solar receiver 10 to minimise heat losses.

Also, the pressure in the high-temperature chamber 30 is advantageously less than the pressure in the solar receiver 10. So the form of gas jet g is caused by detente of the heat transfer fluid f as it leaves the injection means 20. This detente of Joule-Thomson type is advantageously permitted with the conduit terminating in a simple nozzle. The injection means 20 have an effect comparable to that of a nozzle. They augment the regularity of the gas jet and ease diffusion of its heat energy in the high-temperature chamber 30 for the needs of the process.

The zone 31 of the chamber 30 where the gas is injected advantageously has a relatively central position to best avoid heating the walls. In FIG. 2, the zone 31 corresponds to a premixing zone (see below).

According to the needs of the industrial process, it is quite possible to have several high-temperature gas arrivals for several injection zones 31, and therefore several fluid injection means 20. The conduit can branch out.

It is clear that it is possible to select fluid which despite high temperatures prevailing in the receiver 10 is always in the liquid state entering the conduit, and which vaporises instantaneously entering the chamber 30 following detente.

As mentioned previously, the temperature of the heat transfer fluid f at high temperature is advantageously between 1000° C. and 2500° C. according to the flame temperature required by the industrial process.

High-Temperature Chamber

As explained previously, the system according to the invention can be adapted to a large number of industrial processes. This adaptation goes through the choice of a high-temperature chamber 30 optionally specific to the preferred process. It is evident that the invention is not limited to any industrial process in particular.

For example, in the fields of metallurgy, steel works or ceramics, a furnace can be selected as high-temperature chamber 30, the high-temperature industrial process being a process for obtaining metallic or ceramic material, such as decarburising of the iron mineral for steel production (chamber 30 is a blast furnace), or the fusion of silica for the production of glass.

Alternatively, the high-temperature chamber 30 can be a chemical reactor, and the high-temperature industrial process an endothermal chemical reaction.

Chemical Reactor

Use of the solar system 1 according to the invention for performing endothermal chemical reactions is particularly significant due to the possibility of choosing the heat transfer fluid, that is the gas or gases comprising the flame, as opposed to the case of combustions, where the same gases ($CO_2$, $CO$, $NO_x$, $SO_x$ . . . ) are always being produced. The latter are pollutants which inter alia are mixed with the reaction products and contaminate them. So, the heat transfer fluid f advantageously comprises chemically inert gas and/or a reagent of said endothermal chemical reaction and/or a product of said endothermal chemical reaction. It is therefore possible to have a perfectly controlled reaction.

At least one reagent r of said endothermal chemical reaction can also be injected into the high-temperature reactor 30 at the level of the injection zone 31 of the heat transfer fluid f high-temperature mentioned previously. So, in the case of reaction with two reagents, one can be used as heat transfer fluid, and the second can be injected into the zone 31. This produces a good mixture whereof one of the reagents is already at a high level of energy. It is also possible to modulate the position of the injection of the reagent (with injections more or less close to the gas flame). This is used in industrial processes to act on the size distribution of particles produced which are submitted to different dwell times.

It is also feasible for there to be more than one high-temperature chamber 30a, 30b, etc. each being a chemical reactor, in particular in the case of complex reactions. These reactors 30 can advantageously be installed in series, the products of the nth reactor being injected into the n+1st reactor.

For example, there is the instance of a reaction A+B+C→D, which would contain the following sub-reactions (X1 and X2 are reactional intermediaries):

$$A+B \rightarrow X1$$

$$X1+C \rightarrow X2$$

$$X2+A \rightarrow D$$

There would be three reactors 30a,b,c each respectively conducting these sub-reactions.

An advantageous embodiment would be using B as heat transfer fluid, providing an injection of A into the first reactor 30a and the third reactor 30c, and an injection of C into the second reactor 30b.

Cracking of Methane

The solar system 1 is particularly adapted to the industrial processes of the production of hydrogen or nanoparticles of carbon from gaseous precursors, often called <<furnace processes>>, or <<procédés au four>> in French.

Accordingly, the preferred endothermal chemical reaction is the cracking of methane for co-synthesis of dihydrogen and carbon black: $CH4(g) \rightarrow 2H2(g)+C(s)$, $\Delta H° = 75$ kJ/mol Advantageously, the heat transfer fluid f is dihydrogen, methane being injected into the high-temperature reactor 30. Any other inert gas stable at very high temperature, such as Ar, He, $N_2$, can also be used as heat transfer fluid f then separated for recycling on leaving the reactor 30.

If the system according to the invention is particularly adapted, it is because performing the cracking reaction at the level of walls irremediably results in the growth of pyrolytic carbon deposits.

Figure 7:
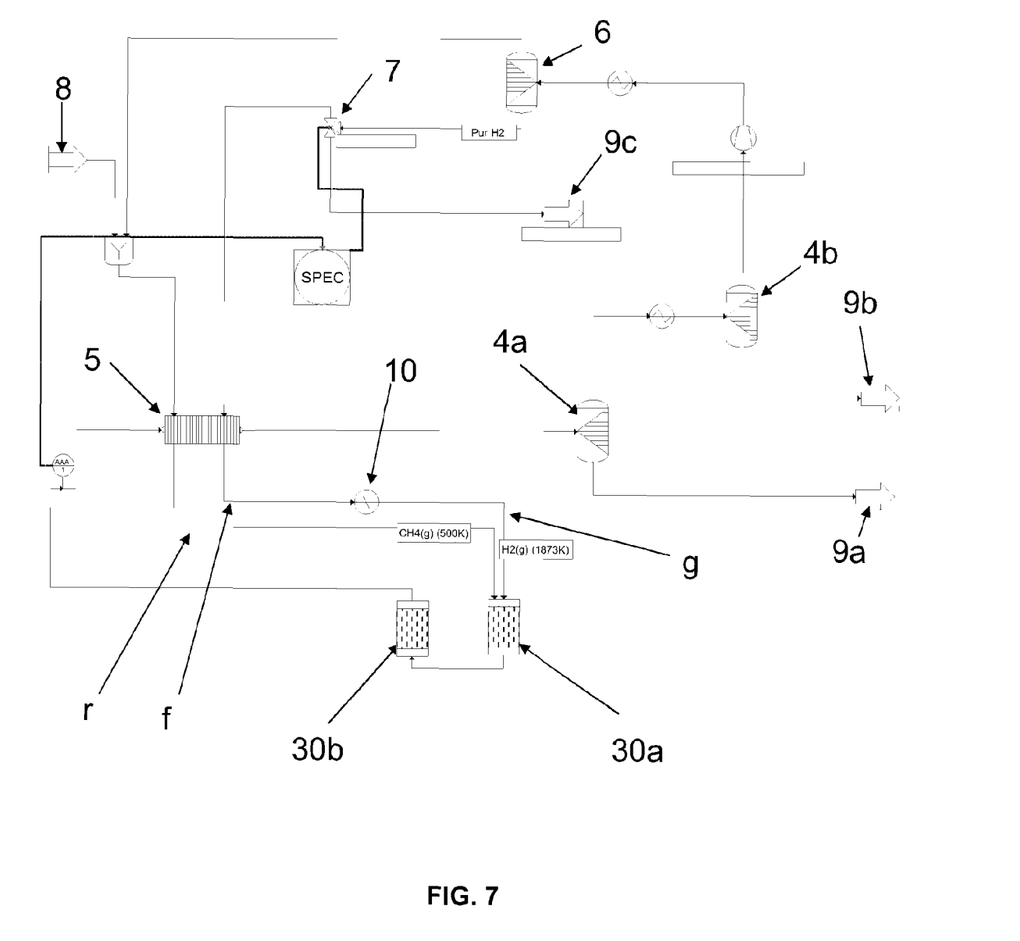
FIG. 7 is a fluid circulation plan (Prosim® software) in a particularly advantageous embodiment of the system according to the invention.

FIG. 7 illustrates a fluid circulation plan (Prosim® software) illustrating particularly advantageously integration of the solar system 1 according to the invention in an industrial installation for production of hydrogen and carbon blacks.

As it leaves the solar receiver 10, hydrogen is injected in the form of gas jet g at 1873° K. This hot gas is them mixed with methane in a high-temperature adiabatic reactor 30, shown in FIG. 7 by two virtually consecutive high-temperature reactors 30a, 30b: the cracking reaction in fact comprises two reactional steps (which take place physically in the same reactor 30).

In the first reactor 30a, the so-called coupling reaction of methane is carried out. Two methane molecules <<combine>> into one molecule of acetylene: $CH_4 \rightarrow ½ C_2H_2 + ³⁄₂ H_2$ (reaction rate 0.9). In the second reactor 30b, the acetylene is dissociated into hydrogen and carbon $C_2H_2 \rightarrow H_2 + 2C$ (reaction rate 0.9).

The process is restricted such that the output temperature of the reactional zone, measured via a sensor, is not less than 900° C. (minimal temperature of the carbon black production process called <<Thermal black>>) by controlling the recirculation flow of $H_2$ heat transfer via the electronically controlled 3-way valve 7. The flow of methane, injected at the level of the inlet 8, is as such here fixed at 400 kg/h.

The products must then pass through a separator 4a of cyclonic exchanger type which separates carbon blacks from gaseous products. Before this cyclone 4 is reached, an exchanger 5 (<<Multi Fluid Heat Exchanger>>) advantageously recovers heat from products both for preheating of the reagent and also gas for heating.

After the cyclone 4a, bag filters 4b can prove necessary for secondary filtration prior to purifying of gaseous products in a pressure-modulated adsorption column 6 (purity of $H_2$ 100%, recovery rate 95%). Earlier, the gas must be compressed. Some of the hydrogen purified at the level of the column 6 is recirculated as heat transfer fluid f to the solar receiver 10 after preheating at the level of the exchanger 5, the other part is recovered at the level of the outlet 9c for evaluation (production of 100 kg/h). The power required for solar heating of hydrogen at the level of the solar receiver 10 is 2.5 MW. Carbon blacks recovered at the level of the cyclone 4a (output of carbon 9a) and at the level of the filters 4b (output of carbon residue 9b) can then be conditioned (production of 300 kg/h).

It should be noted that the dissociation process proposed here is quite similar to conventional industrial processes, where only the heat contribution is different: instead of using the combustion of fossil sources for heating methane, high-temperature fluid previously heated by concentrated solar energy is injected. This leaves the same flexibility as that which the traditional furnace process can exhibit in terms of pre- and post-treatment of products (ex: oxidising post-treatment for adjusting the properties of carbon black).

The system according to the invention is not at all limited to cracking of methane, and the expert can adapt it to execution of any industrial process needing a combustion flame.

Process

According to a second aspect, the invention relates to a process associated with the solar system according to the first aspect of the invention.

This is therefore a process for providing volumetric energy reproducing the effect of a combustion flame for a high-temperature industrial process, characterised in that it comprises steps of:
  irradiation of a solar receiver 10 in which heat transfer fluid f circulates by concentrated solar radiation to bring the heat transfer fluid f to high temperature;
  injection of the heat transfer fluid f into a high-temperature chamber 30 in the form of a gas jet g reproducing a combustion flame;
  performing said high-temperature industrial process in the high-temperature chamber 30 under the effect of the combustion flame produced.

This process reprises the mechanisms explained previously. It applies to the same industrial processes and it is advantageously implemented by one of the solar system embodiments described previously.

The invention claimed is:
1. A solar system for providing volumetric energy reproducing the effect of a combustion flame for a high-temperature industrial process, characterised in that it comprises:
  a solar receiver exposed to concentrated solar radiation, in which a liquid or gaseous heat transfer fluid is brought to high temperature;

at least one high-temperature chamber distinct from the solar receiver in which said high-temperature industrial process is performed;

injection means separating the solar receiver from the at least one high-temperature chamber, such that the heat transfer fluid is configured to pass from the solar receiver into the injection means and from the injection means into the at least one high-temperature chamber in the form of a gas jet reproducing a combustion flame.

2. The system as claimed in claim 1, in which the solar receiver comprises a cavity, the cavity being provided with an opening transparent to concentrated solar radiation, and at least one solar absorption element irradiated by the concentrated solar radiation through the opening.

3. The system as claimed in claim 2, in which the solar absorption element or the solar absorption elements are tubes and/or ducts lining at least one wall of the cavity.

4. The system as claimed in claim 3, in which the heat transfer fluid circulates in the solar absorption element or the solar absorption elements, the heat transfer fluid being brought to high temperature by heat transfer in contact with the internal surface of the solar absorption elements.

5. The system as claimed in claim 2, in which the heat transfer fluid circulates in the cavity, the opening being covered with a porthole transparent to concentrated solar radiation and sealed, and the heat transfer fluid being brought to high temperature by heat transfer in contact with the external surface of the solar absorption element or solar absorption elements.

6. The system as claimed in claim 2, in which the cavity and the solar absorption element or the solar absorption elements are made of ceramic or graphite.

7. The system as claimed in claim 1, in which the solar receiver is traversed by a duct in which the heat transfer fluid is in motion, the heat transfer fluid being brought to high temperature by heat transfer in contact with the internal surface of a wall of the duct whereof the external surface is irradiated by the concentrated solar radiation.

8. The system as claimed in claim 1, in which the heat transfer fluid is injected under pressure into the solar receiver.

9. The system as claimed in claim 8, in which the injection means of the heat transfer fluid in the high-temperature chamber consist of a conduit via which the high-temperature heat transfer fluid escapes from the solar receiver to the high-temperature chamber under the effect of the internal pressure in the solar receiver.

10. The system as claimed in claim 9, in which the pressure in the high-temperature chamber is less than the pressure in the solar receiver, the form of gas jet being caused by the detente of the heat transfer fluid as it leaves the injection means.

11. The system as claimed in claim 1, in which the temperature of the high-temperature heat transfer fluid is between 1000° C. and 2500° C.

12. The system as claimed in claim 1, in which the high-temperature chamber is a furnace, and the high-temperature industrial process is a process for obtaining metallic or ceramic material.

13. The system as claimed in claim 1, in which the high-temperature chamber is a chemical reactor, and the high-temperature industrial process is an endothermal chemical reaction.

14. The system as claimed in the claim 13, in which the heat transfer fluid comprises chemically inert gas and/or a reagent of said endothermal chemical reaction and/or a product of said endothermal chemical reaction.

15. The system as claimed in claim 13, in which at least one reagent of said endothermal chemical reaction is injected into the high-temperature reactor at the level of an injection zone of the high-temperature heat transfer fluid.

16. The system as claimed in claim 13, in which the endothermal chemical reaction is the cracking of methane.

17. The system as claimed in claim 16, in which the heat transfer fluid is dihydrogen, methane being injected into the high-temperature reactor.

18. The system as claimed in claim 13, comprising a plurality of high-temperature chambers each being a chemical reactor, the products of the nth reactor being injected into the n+1st reactor.

19. A process for providing volumetric energy reproducing the effect of a combustion flame for a high-temperature industrial process, characterised in that it comprises steps of:

irradiation of a solar receiver in which a liquid or gaseous heat transfer fluid circulates by concentrated solar radiation to bring the heat transfer fluid to high temperature;

injection of the heat transfer fluid from the solar receiver into a conduit and from the conduit into a high-temperature chamber distinct from the solar receiver in the form of a gas jet reproducing a combustion flame; and performing said high-temperature industrial process in the high-temperature chamber under the effect of the combustion flame produced.

20. A solar system for providing volumetric energy reproducing the effect of a combustion flame for a high-temperature industrial process, characterised in that it comprises:

a solar receiver exposed to concentrated solar radiation, in which a liquid or gaseous heat transfer fluid is brought to high temperature;

at least one high-temperature chamber distinct from the solar receiver in which said high-temperature industrial process is performed;

a conduit separating the solar receiver from the at least one high-temperature chamber, such that the heat transfer fluid is configured to pass from the solar receiver into the conduit and from the conduit into the at least one high-temperature chamber in the form of a gas jet reproducing a combustion flame.

* * * * *